United States Patent

[15] 3,697,872

Schulz

[45] Oct. 10, 1972

[54] CIRCUIT FOR MEASURING THE POWER CONSUMPTION OF THREE PHASE LOADS

[72] Inventor: Jurgen Schulz, Plochingen, Germany

[73] Assignee: Robert Bosch GmbH, Stuttgart, Germany

[22] Filed: Jan. 28, 1971

[21] Appl. No.: 110,417

[30] Foreign Application Priority Data

Feb. 3, 1970 Germany..........P 20 04 685.9

[52] U.S. Cl..................................324/142, 324/107
[51] Int. Cl............................G01r 7/00, G01r 21/00
[58] Field of Search..............................324/107, 142

[56] References Cited

UNITED STATES PATENTS 3,497,804   2/1970   Schmidt et al.............324/107

*Primary Examiner*—Alfred E. Smith
*Attorney*—Michael S. Striker

[57] ABSTRACT

Two of the three phases are connected in series with the primary of a respective current transformer, the secondary of each transformer being connected to a respective current divider that separates the secondary current into an in-phase component and into an out of phase component, the in-phase component of one current divider and the out of phase component of the other current divider being connected to one end of the current path of a watt meter, the other end being connected to the out of phase component of the one current divider and the in-phase component of the other current divider. The voltage path of the watt meter is connected across the load.

13 Claims, 2 Drawing Figures

PATENTED OCT 10 1972          3,697,872

INVENTOR
Jürgen SCHULZ

By
*[signature]* his ATTORNEY

CIRCUIT FOR MEASURING THE POWER CONSUMPTION OF THREE PHASE LOADS

BACKGROUND OF THE INVENTION

The invention relates to a circuit, employing a single phase watt meter, for measuring the power consumption of three phase loads, such as three phase motors.

In known circuits of this kind, the current path of the single phase watt meter is connected to one phase of the three phase system, the voltage path being connected to two phases of the system or to one phase and to the neutral wire.

Since this known circuit cannot detect unbalanced loading of the three phase system, the measurements are sometimes incorrect.

SUMMARY OF THE INVENTION

An object of the invention is a circuit, employing a single phase watt meter, for measuring power input to a three phase load, which circuit is largely free of the aforesaid measuring error.

The circuit of the invention consists essentially of first and second current transformer means having each a primary and a secondary winding, each primary winding being connected in series with a different one of the three phases connected to the load, a respective current divider connected to each secondary winding for dividing the secondary current of the associated secondary winding into an in-phase component and into an out of phase component, and a single phase watt meter having a current path, the current path being connected to the in-phase component of each current divider.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
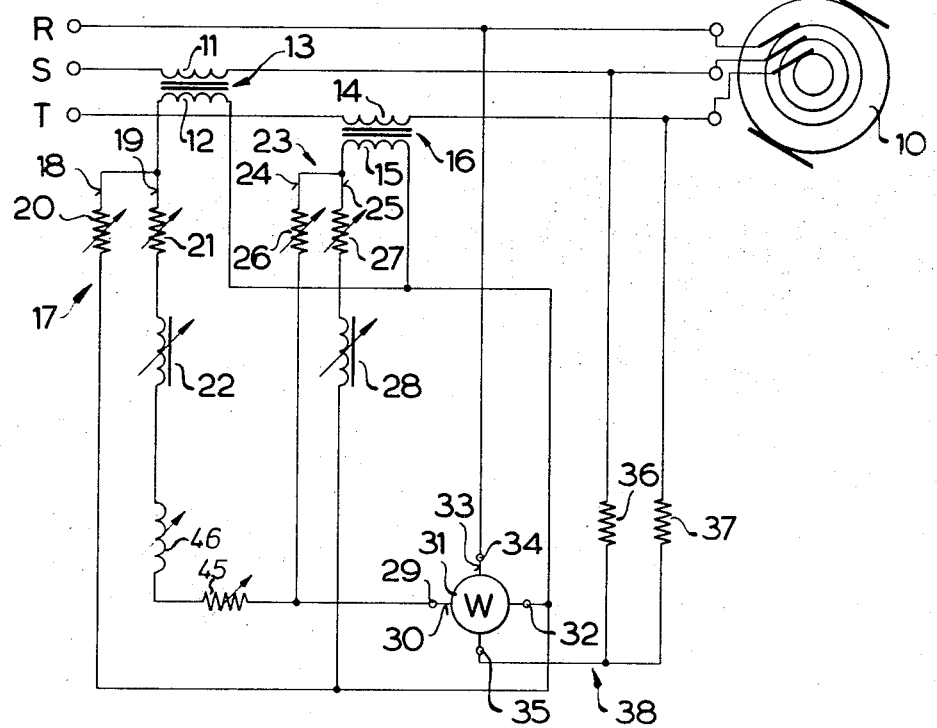
FIG. 1 is a circuit diagram of one embodiment of the invention.

With reference to FIG. 1, a three phase motor 10 is connected to the three phases R, S, and T of a three phase system. The primary windings 11 and 14 of first and second current transformers 13 and 16 are respectively connected in series with the phases S and T. The secondary winding 12 of the current transformer 13 is connected at one end to a first current divider 17, which has two branches 18 and 19 connected to the secondary 12. The branch 18 contains an adjustable, substantially non-inductive, resistor 20; and the branch 19 consists of an adjustable, substantially non-inductive, resistor 21 and of a coil 22 which may be wound about a core having fixed and movable parts which define a variable air gap. In a similar manner, one end of the secondary winding 15 of the second current transformer 16 is connected to a second current divider 23 having two branches 24 and 25. An adjustable, substantially non-inductive, resistor 26 is connected in the branch 24; and the branch 25 consists of an adjustable, substantially non-inductive, resistor 27 and of a coil 28 having a variable air gap. The branches 19 and 24 are connected by a terminal 29 to one end of the current path 30 (usually the stationary coil of a two-coil single phase watt meter) of a single phase watt meter 31, of which the terminal 32 at the other end of the current path is connected to the ends of the secondary windings 12 and 15 of the current transformers 13 and 16. As will be seen below, "in-phase" branches 19 and 24 serve to carry components of the in-phase current, whereas "out-of-phase" branches 18 and 25 serve to carry out-of-phase current components. FIG. 1 shows that leads, constituting return-flow current path means, are connected with branches 18 and 25 and with secondaries 12 and 15, and that they provide a return flow path for out-of-phase current components. The voltage path 33 (usually the movable coil) of the single phase watt meter 31 is connected at one end by a terminal 34 to the phase R and at the other end by a terminal 35 to the resistors 36 and 37, which latter, together with the voltage path 33, constitute a Y connection 38 of the three phase system.

The circuit just described enables accurate measurement of unbalanced power input to three phase loads, such as motors.

Electrical engineering teaches that an unbalanced three phase system of voltages can be resolved into three balanced components: in phase component $U_m$, an out of phase component $U_g$, and a zero component $U_o$. Similarly, the currents of an unbalanced three phase system can be resolved into corresponding currents $I_m$, $I_g$ and $I_o$.

The zero component is suppressed by connecting the voltage path 33 of the single phase watt meter 31 to the Y connection 38, as shown in FIG. 1.

The equation for power for a single phase is $$P_w = U_m \cdot I_m \cdot \cos \varphi_m + \underbrace{U_g \cdot I_g \cdot \cos \varphi_g}_{a} + \underbrace{U_m \cdot I_g \cdot \cos (\varphi_g + \psi)}_{b} + \underbrace{U_g \cdot I_m \cdot \cos (\varphi_m - \psi)}_{c}$$

The equation terms $a$ and $b$, which express the unbalanced components, introduce errors into the measured result, and can be eliminated by the circuit of the invention. Term $c$ is negligibly small with the customary three phase system, but it also can be eliminated by a suitable circuit in the voltage path of the single phase watt meter.

In the equation
I = current
U = voltage
subscript $m$ = in phase component
subscript $g$ = out of phase component
$\phi m, \phi g$ = phase angle between the voltage and current indicated
$\psi$ = phase angle between $U_m$ and $U_g$ Assuming that the losses in the current transformers 13 and 16 are negligible, the secondary currents are $I_s' = I_s$ and $I_T' = I_T$.

The primed currents are the currents in the secondary windings, and the unprimed currents are the currents in the primary windings, of the current transformers 13 and 16. These currents have the following composition:

$I_s' = I_{sm}'$ and $I_{sg}'$, and $I_T' = I_{Tm}'$ and $I_{Tg}'$.

The branches of the current dividers 13 and 16 have the following impedances:

Branch 18: $R_{20}$

Branch 19: $Z_{19} = \sqrt{\omegaز L_{22}^2 + R_{21}^2} \angle 60°$

Branch 24: $R_{26}$

Branch 25: $Z_{25} = \sqrt{\omega z L_{28}^2 + R_{27}^2} \angle 60°$

If $Z_{19} = R_{20}$ and $R_{26} = Z_{25}$ is a phase shift of 60° between the branches of the same current divider.

The magnitudes of the currents in the branches 18, 19, 24, and 25 are as follows:

$I_{sm}' = 1/3 I_s \angle +120° - 1/3 I_s$
$I_{sg}' = 1/3 I_s \angle -120° - 1/3 I_s$
$I_{Tm}' = 1/3 I_T \angle -120° - 1/3 I_T$
$I_{Tg}' = 1/3 I_T \angle +120° - 1/3 I_T$ If the two currents of both current dividers 17 and 23 are added together, by connecting together the branches 18 and 25, on the one hand, and 19 and 24, on the other, there is obtained:

$I_m' = I_{sm}' + I_{Tm}'$
$\quad = 1/3 I_s \angle 120° - 1/3 I_s + 1/3 I_T \angle -120° - 1/3 I_T;$
$I_g' = I_{sg}' + I_{Tg}'$
$\quad = 1/3 I_s \angle -120° - 1/3 I_s + 1/3 I_T \angle 120° - 1/3 I_T.$ Since, however, $-I_s - I_T = I_R$ there results:

$I_m' = 1/3 I_s \angle 120° + 1/3 I_T \angle -120° + 1/3 I_R = I_m;$
$I_g' = 1/3 I_s \angle -120° + 1/3 I_T \angle 120° + 1/3 I_R = I_g$ Thus, the circuit of the invention enables formation of both the in phase component and of the out of phase component, and separate measurement of each of these components, depending upon the connection of the watt meter.

If the components of the circuit are made sufficiently large, a second instrument, such as a recorder, can be connected to the measuring circuit.

Those errors that appear if the total impedance of the current path 30 is not negligible, can be eliminated by adjusting the value of this impedance so that the phase angle ε is equal to the phase angle of the parallel connected impedances $R_{20}$, $Z_{19}$, $R_{26}$, and $Z_{25}$. Conventional means can be used to correct the amplitude errors. For correction of the aforesaid phase errors, an adjustable inductor 46 can be connected, as shown in FIG. 1, in series with the current path 30. The amplitude errors can be corrected by an adjustable resistor 45 also connected in the current path 30. It is important that the impedance of the watt meter is matched to that of the transformer circuit.

Figure 2:
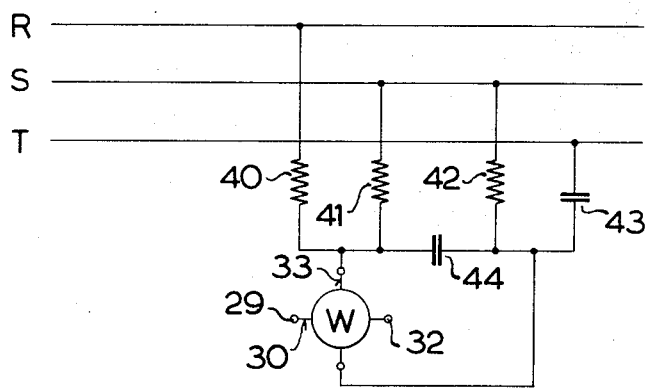
FIG. 2 is a circuit diagram showing the modified part of the form of the invention shown in FIG. 1.

If the out of phase voltage component $U_g$ is relatively large, the term $c$ the equation for $P_w$ is no longer negligibly small. The circuit shown in FIG. 2 eliminates this unbalance.

The current path 30 of the watt meter is connected to the same circuit components as in the embodiment shown in FIG. 1. The voltage path 33 is connected to a circuit that supplies only the in phase components $U_m$, the circuit suppressing the out of phase voltage components $U_g$. Two resistors 40 and 41 of the Y connection are connected between the phases R and S and one end of the voltage path 33. The third branch of the Y connection, which contains the resistance of the voltage path 33, is connected to the common terminal of a voltage divider consisting of a substantially non-inductive resistor 42 and of a capacitor 43. Any phase errors that appear because of the loading of both the voltage divider (42, 43) and any possible inductance of the resistance of the voltage path 33 are corrected by the parallel capacitor 44.

It will be understood that each of the elements described above, or two or more together, may also find a useful application in other types of circuits differing from the types described above.

While the invention has been illustrated and described as embodied in a circuit for measuring the power consumption of three phase loads, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. A circuit for measuring the power input from a three phase system to a three phase load, such as a three phase motor, comprising, in combination, first and second current transformer means each comprising a primary winding for connection in series with one of the three phases connected to the load, and a secondary winding; first and second current divider means respectively connected with the secondary windings of said first and second transformer means for dividing the secondary currents associated with said secondary windings into in-phase and out-of-phase current components, each of said current divider means comprising in-phase and out-of-phase branches respectively carrying the in-phase and out-of-phase current components; a single-phase wattmeter including a wattmeter current path connected with said in-phase branches, whereby to carry the resultant of said in-phase current components; and return-flow current path means connected with said out-of-phase branches and with said secondary windings and providing a return-flow path for said out-of-phase current components from said out-of-phase branches to said secondary windings.

2. A circuit as defined in claim 1, wherein each of said current dividers includes reactive and resistive means to obtain said in-phase and out of phase components.

3. A circuit as defined in claim 2, wherein each of said current dividers includes a branch with resistive means and a branch with resistive-reactive means.

4. A circuit as defined in claim 3, wherein said resistive-reactive means includes a resistive means and an inductive means.

5. A circuit as defined in claim 4, wherein said inductive means is adjustable.

6. A circuit as defined in claim 1, said current path of said single-phase wattmeter having one end connected with said in-phase branches and another end connected with said out-of-phase branches.

7. A circuit as defined in claim 1, wherein said watt meter has a voltage path, and further including a Y connection for the three phase system, the common junction of said Y connection being connected to said voltage path.

8. A circuit as defined in claim 7, wherein said voltage path is connected across the load.

9. A circuit as defined in claim 1, wherein said wattmeter has a voltage path, and including a Y connection for the three phase system, the common junction of said Y connection being connected to one end of said voltage path; and a voltage divider having resistive and reactive means connecting the other end of said voltage path to the three phase system.

10. A circuit as defined in claim 9, wherein said Y connection includes said voltage path and also includes first and second resistors, each of said first and second resistors connected to a different one of the three phases, and said voltage path includes a third resistor and a first capacitor, each connected to a different one of the three phases, said third resistor and first capacitor being connected to said other end of said voltage path, all three phases being connected to at least one of said first, second, and third resistors and first capacitor.

11. A circuit as defined in claim 10, further including a second capacitor shunted across said voltage path for correcting phase errors introduced by the loading of both said voltage divider and any inductance in said voltage path.

12. A circuit as defined in claim 1, including means for correcting phase errors caused by said current path.

13. A circuit as defined in claim 12, wherein said means for correcting phase errors caused by said current path is an adjustable inductor connected in series with said current path.

* * * * *